Patented Apr. 20, 1948

2,440,101

UNITED STATES PATENT OFFICE 2,440,101

TRIS-(TRIMETHYLSILYL) BORATE AND METHOD OF PREPARING THE SAME

Robert Henry Krieble, Schenectady, N. Y., assignor to General Electric Company, a corporation of New York No Drawing. Application May 7, 1947, Serial No. 746,629

3 Claims. (Cl. 260—448.2)

This invention relates to a composition of matter and its preparation. More particularly, the instant invention is concerned with a novel composition of matter consisting of tris-(trimethylsilyl) borate and its preparation. This compound has the formula

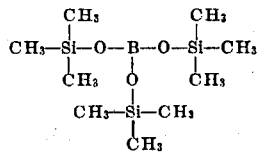

Tris-(trimethylsilyl) borate may be prepared in several ways. One method comprises effecting reaction between a trimethyl alkoxysilane of the general formula $(CH_3)_3Si$—OR where R is a lower alkyl radical of from 1 to 4 carbon atoms, e. g., methyl, ethyl, propyl, isopropyl, butyl, etc., and boric acid $(H_3BO_3)$, preferably in the presence of an acidic esterification catalyst, for example, sulfuric acid, hydrochloric acid, para-toluene sulfonic acid, camphor sulfonic acid, etc. Although the reaction proceeds at normal temperatures and pressures, the esterification reaction is preferably carried out under the influence of heat and advantageously at the reflux temperature of the mass, using atmospheric pressures.

The trimethyl alkoxysilane and boric acid are preferably present in a molar ratio of at least 3 or more, e. g., from about 3 to 6 mols of the former per mol of the latter.

In order that those skilled in the art may better understand how the preparation of the claimed composition of matter may be effected, the following description is given.

Approximately 35.5 grams (0.30 mol) of trimethylethoxysilane, 6.2 grams (0.10 mol) boric acid, and 10 milligrams para-toluene sulfonic acid were heated together at the reflux temperature of the mass for about five hours. At the end of this time the reaction product was fractionally distilled to yield tris-(trimethylsilyl) borate boiling at 90° C. ($n_D^{20} = 1.3859$). Analysis of the compound showed that it contained 3.89 per cent boron (calculated 3.89 per cent).

Tris-(trimethylsilyl) borate may be employed as an intermediate in the preparation of other chemical compounds. It may also be used as a means for condensing dimethyl silicones having a ratio of about 1.98 to 2.0 methyl groups per silicon atom to yield compositions of matter having the properties of those disclosed and claimed in Wright application Serial No. 569,647, filed December 23, 1944, and assigned to the same assignee as the present application. My claimed composition of matter may also be employed as a plasticizer for the compositions claimed in the aforementioned Wright application.

What I claim as new and desire to secure by Letters Patent of the United States is:

1. Tris-(trimethylsilyl) borate.
2. The process for preparing tris-(trimethylsilyl) borate which comprises effecting reaction in the presence of an acidic esterification catalyst between (1) boric acid and (2) a trimethyl alkoxysilane of the general formula $(CH_3)_3Si$—OR where R is a lower alkyl radical.
3. The process for preparing tris-(trimethylsilyl) borate which comprises effecting reaction in the presence of para-toluene sulfonic acid between (1) boric acid and (2) trimethyl ethoxysilane, compounds (1) and (2) being present in a molar ratio equal to at least three mols of the latter per mol of the former, and thereafter isolating the aforementioned tris-(trimethylsilyl) borate.

ROBERT HENRY KRIEBLE.